UNITED STATES PATENT OFFICE.

ORVILLE M. KNOX, OF KNOXBOROUGH, NEW YORK.

IMPROVEMENT IN COMPOUNDS FOR DESTROYING HOP-GRUBS, &c.

Specification forming part of Letters Patent No. 166,207, dated August 3, 1875; application filed February 8, 1873.

*To all whom it may concern:*

Be it known that I, ORVILLE M. KNOX, of Knoxborough, Oneida county, State of New York, have invented a certain compound called Knox's Hop-Grub Destroyer and Fertilizer, of which the following is a specification:

This invention relates to that class of compounds used to destroy hop-grubs and other similar worms or insects, and also acts as a fertilizer of the soil and stimulator to the hop or other plant.

The invention consists in the combination of three ingredients—*i. e.*, sulphur, pulverized plaster, and common salt, mixed thoroughly together in the proportions hereinafter named.

To prepare the compound I mix the above-named ingredients in about the following proportions: Ten pounds of sulphur, ten pounds of common pulverized plaster, and two hundred pounds of common salt, which, when thoroughly mixed, is ready to be applied in the following manner:

I take about three table-spoonfuls of the compound, and apply it to one hill of hops upon the ground's surface around the roots.

This composition, in addition to destroying the grubs, serves also as an excellent fertilizer, as experiment has amply demonstrated.

Having thus fully described my invention, what I claim as new, and desire to secure by Letters Patent, is—

The within and foregoing described compound, consisting of sulphur, pulverized plaster, and common salt, mixed in about the proportion of ten parts sulphur, ten parts pulverized plaster, and two hundred parts of common salt, all substantially as and for the purposes specified.

ORVILLE M. KNOX.

Witnesses:
F. S. HALL,
N. W. PORTER.